United States Patent

Hintringer et al.

[15] 3,641,351
[45] Feb. 8, 1972

[54] LASER DEVICE FOR CONTROLLED GUIDANCE OF FABRICATING MACHINE

[72] Inventors: Otmar Hintringer, Neubiberg; Walter Königer, Munich; Jürgen Thorn, Haar, all of Germany

[73] Assignee: Siemens Aktiengesellschaft, Berlin, Germany

[22] Filed: Oct. 15, 1969

[21] Appl. No.: 866,568

[30] Foreign Application Priority Data

Oct. 31, 1968 Germany.....................P 18 06 450.1

[52] U.S. Cl..........................250/203, 250/217, 37/DIG. 20, 172/4.5
[51] Int. Cl..............................................G01j 1/20
[58] Field of Search..................250/215, 203, 234, 217, 208, 250/209; 356/172; 37/DIG. 20; 172/4.5

[56] References Cited

UNITED STATES PATENTS

| | | |
|---|---|---|
| 3,141,418 | 7/1964 | Clayborne et al...............356/172 X |
| 3,452,207 | 6/1969 | Tsukkerman...........................250/215 |
| 3,482,103 | 12/1969 | Martinsen...............................250/203 |
| 3,514,608 | 5/1970 | Whetter............................250/217 X |

*Primary Examiner*—Walter Stolwein
*Attorney*—Curt M. Avery, Arthur E. Wilfond, Herbert L. Lerner and Daniel J. Tick

[57] ABSTRACT

A receiver stably affixed to a fabricating machine comprises at least two spaced photosensitive units, positioned transversely to a reference plane formed by a flared modulated laser guide beam, one on each side of the reference plane. A difference amplifier is connected to the photosensitive units in a manner whereby deviation of the fabricating machine from the reference plane produces an output control signal of the difference amplifier for guiding the fabricating machine back into the reference plane.

8 Claims, 6 Drawing Figures

Fig.1
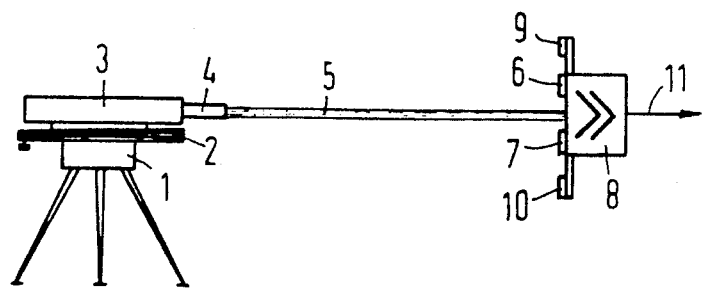
Fig.2
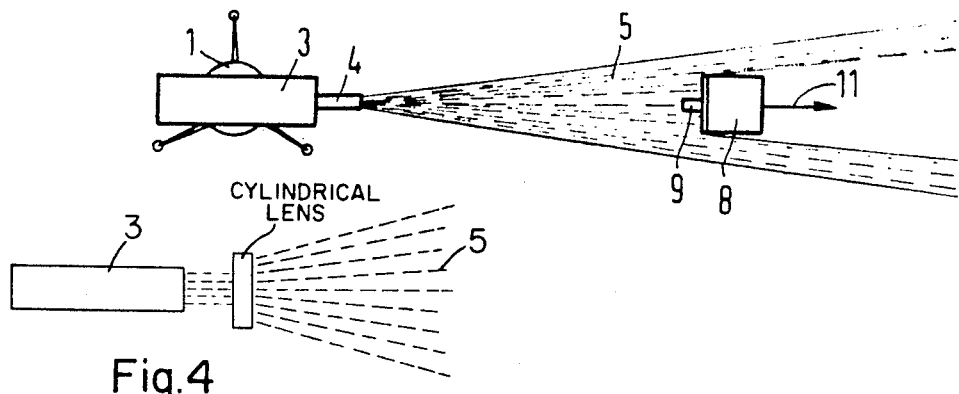
Fig.3
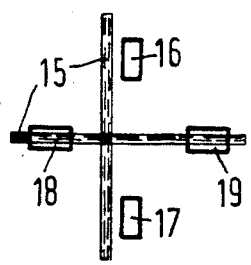
Fig.4
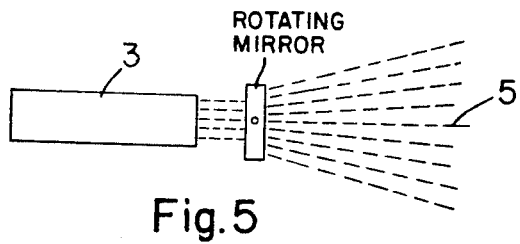
Fig.6
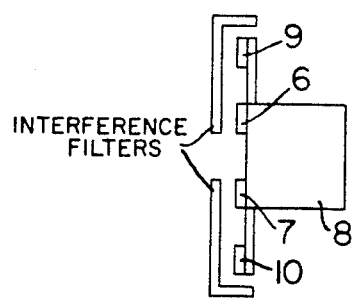
Fig.5

LASER DEVICE FOR CONTROLLED GUIDANCE OF FABRICATING MACHINE

DESCRIPTION OF THE INVENTION

The present invention relates to a laser device for the controlled guidance of a fabricating machine. More particularly, the invention relates to the controlled guidance of a fabricating machine in a reference plane and in a reference line.

Due to the particular characteristics or peculiarities of the laser beam, with respect to high parallelism and high light density, the use of laser beams acquires increased importance for optical adjustment and guide beam processes.

In a basic case, firmly mounted laser apparatus produces a visual beam which is impinged upon a screen having a cross wire. The screen is positioned at the object to be guided, so that the deviation of the light spot from the center point of the cross wire is visually observed and permits the corresponding control of the object. In order to automatically control fabricating machines which require precise directional control such as, for example, rail or track building machines, tunnel driving shields, or the like, it has been suggested that the machines to be controlled to provided with photosensitive units which automatically determine the position of the machine relative to a laser guide beam and use the position determination to control the drive of the machine. Such apparatus has a disadvantage due to the fact that the utilization of bunched or concentrated laser radiation requires specific safety or precautionary measures to protect the operating staff. In many cases, the danger cannot be fully eliminated and often results in injury to operating personnel, particularly to their eyes. It has therefore been proposed to flare or fan out the laser beam in a plane, so that, even at a short distance from the laser apparatus, the radiation is far below a hazardous threshold.

Receiving apparatus for an automatic guide beam system, which provides sufficient accuracy, is too complex and complicated for many uses and is too expensive, since the full beams heretofore utilized require an entire receiving field comprising a plurality of photosensitive units positioned in matrix form.

The principal object of our invention is to provide a new and improved device for the controlled guidance of a fabricating machine.

An object of the invention is to provide a device for the controlled guidance of a fabricating machine with accuracy.

An object of our invention is to provide a device for the controlled guidance of a fabricating machine which functions with efficiency, effectiveness and reliability.

An object of our invention is to provide a device for the controlled guidance of a fabricating machine which is of simple structure, but accurate in operation.

An object of the invention is to provide a laser device for the controlled guidance of a fabricating machine with great accuracy, efficiency, effectiveness and reliability in operation.

In accordance with our invention, a device for the controlled guidance of a fabricating machine in a reference plane comprises securely mounted laser apparatus producing a modulated guide beam. A flaring device adjacent the laser apparatus flares the guide beam in the reference plane. Receiving apparatus stably affixed to a fabricating machine comprises at least two spaced photosensitive units positioned transversely to the reference plane, one on each side of the reference plane, and a difference amplifier connected to the photosensitive units in a manner whereby deviation of the fabricating machine from the reference plane produces an output control signal of the difference amplifier for guiding the fabricating machine back into the reference plane.

The flaring device may comprise a cylindrical lens positioned in the path of the guide beam, or a rotatably mounted mirror positioned in the path of the guide beam and rotated about an axis perpendicular to the reference plane. Scattered radiation shields may be provided adjacent the photosensitive units for protecting the photosensitive units from external scattered radiation. The shields comprise interference filters tuned to the guide beam.

In accordance with our invention, a device for the controlled guidance of a fabricating machine in a straight reference line comprises securely mounted laser apparatus producing a guide beam. A beam-dividing device adjacent the laser apparatus is positioned in the path of the guide beam and produces two component bundles of rays. A flaring device adjacent the beam-dividing device flares each of the component bundles of rays in a manner whereby the flared bundles of rays form two reference planes crossing each other at substantially right angles. Receiving apparatus affixed to a fabricating machine comprises two sets of at least two spaced photosensitive units. Each set of photosensitive units on each side of the corresponding one of the reference planes with at least one of its photosensitive units on each side of the corresponding one of the reference planes. Each of a pair of difference amplifiers is connected to a corresponding set of the photosensitive units in a manner whereby deviation of the fabricating machine from the reference line produces an output control signal of the difference amplifiers for guiding the fabricating machine back into the reference line.

The flaring device may comprise two cylindrical lenses each positioned in the path of a corresponding one of the bundles of rays, or two rotatably mounted mirrors each positioned in the path of a corresponding one of the bundles or rays and rotated about an axis perpendicular to a corresponding one of the reference planes.

We have recognized that, in order to provide accurate control with receiving apparatus having only two photosensitive units, elements or cells, said photosensitive units must be positioned in closely adjacent or overlapping relation in order to detect even small deviations from the reference plane. This cannot be realized in practice in simple receiving apparatus when full laser beams are utilized, because even at a small lateral deviation of the laser beam, the receiving apparatus is unable to function, so that the laser beam, which normally impinges upon an area between the two photosensitive units, still impinges upon both photosensitive units, and independent operation of said photosensitive units to provide an automatic determination is impossible under any circumstances. The utilization of a difference amplifier, however, provides a determination of the slight variation in the density of radiation at both photosensitive units, and such variation of the density of radiation is utilized to produce a control signal for controlling the drive of the fabricating machine.

The device of our invention is particularly applicable to drainage plows or machinery, since, in such use, only the digging depth of the grab must be exactly controlled. Generally, the travel direction and the grab direction is relatively noncritical. In this case, the machine to be controlled is only the grab, since the level of the grab may be shifted by a hydraulic device.

The modulation of the laser beam permits the elimination of the sunlight, since sunlight has considerably greater energy density than a laser beam. The modulation of the laser beam also eliminates external scattered radiation. An amplifier assists in eliminating scattered radiation by having its modulation frequency selectively adjusted. The interference filters shield the photosensitive units from external scattered radiation such as, for example, floodlights or intensive sunlight. Otherwise, the shot effect or noise of the direct current produced by the photosensitive units will be amplified to such an extent that it will constitute the sensitivity threshold or limit and thereby impair the range of operation of the apparatus.

When a rotating mirror is utilized to flare the laser beam in a plane, the laser beam is not continuously flared. This, however, is unimportant as long as the rotating velocity, and thus also the frequency of deviation, of the laser beam, are sufficiently high. When a rotating mirror is used to flare the laser beam, separate or special modulation of the laser beam may be dispensed with when the frequency of deviation is adequate.

In order that our invention may be readily carried into effect, it will now be described with reference to the accompanying drawing, wherein:

FIG. 1 is a schematic diagram of a side view of an embodiment of the laser device of the invention for the controlled guidance of a fabricating machine;

FIG. 2 is a schematic diagram of a top view of the embodiment of FIG. 1;

FIG. 3 is a schematic diagram of an end view of an other embodiment of the device of the invention for the controlled guidance of a fabricating machine;

FIG. 4 is a schematic diagram of a cylindrical lens for flaring the guide beam;

FIG. 5 is a schematic diagram of a rotating mirror for flaring the guide beam; and FIG. 6 is a schematic diagram of interference filters for shielding the photosensitive units from external scattered radiation.

In the FIGS., the same components are identified by the same reference numerals. The fabricating machine is not shown in the FIGS. in order to maintain the clarity of illustration. The fabricating machine may comprise, for example, a drainage plow.

In FIGS. 1 and 2, a structure 1 supports mounted laser apparatus 3 via a Nivellier device 2. The laser apparatus 3 produces a laser beam which is flared or fanned in a horizontal plane by a flaring device 4, which may comprise a cylindrical lens (FIG. 4) or a rotating mirror (FIG. 5). The flared laser beam 5 constitutes the reference plane, relative to which the fabricating machine must maintain its height. In accordance with usage, of course, an inclined plane may be utilized as the reference plane rather than a horizontal plane.

The fabricating machine, which may be, for example, the grab of a drainage plow, is provided with receiving apparatus. The receiving apparatus comprises photosensitive units, elements or cells which, in the basic structure, number only two overlapping photosensitive units 6 and 7, as shown in FIG. 1. Since the laser beam 5 is not actually as sharply limited in its vertical and horizontal dimensions or boundaries, as shown in FIGS. 1 and 2, the photosensitive units 6 and 7 are excited or actuated even when said laser beam does not fully impinge upon one of said photosensitive units. The device thus responds to the slightest vertical deviations of the fabricating machine from the reference plane.

A difference amplifier 8 has inputs connected to the outputs of the photosensitive units 6 and 7 and an output connected to an output line 11. The output signal produced by the difference amplifier 8 is zero when the center of gravity of the laser beam 5 is centered between the photosensitive units 6 and 7. During a vertical deviation of the fabricating machine, which thus causes a corresponding vertical deviation of the receiving apparatus comprising the photosensitive units 6 and 7, one of said photosensitive units is illuminated more strongly than the other. A positive or negative signal of greater or lesser amplitude is thus produced by the difference amplifier 8.

The sensitivity of response of the device of our invention may be adjusted by expanding the laser beam 5 in vertical directions, as well as through the distance between the two photosensitive units 6 and 7. The device will also respond if a sudden deviation of the fabricating machine from the reference plane causes the laser beam 5 to move downward via one of the two photosensitive units 6 and 7, provided that at least part of said laser beam still impinges upon said one of said photosensitive units.

When such sudden shifts from the reference plane occur frequently, it may be of advantage to provide a pair of additional photosensitive units, cells or elements 9 and 10. The additional photosensitive unit 9 may be vertically positioned above the photosensitive unit 6 and the additional photosensitive unit 10 may be vertically positioned below the photosensitive unit 7. The additional photosensitive units 9 and 10 may be connected to the inputs of a second difference amplifier.

The output signal produced by the second difference amplifier may be utilized as a warning or alarm, or to deenergize the fabricating machine by appropriate control circuit, since any deviations from the reference plane strong enough to affect the additional photosensitive units 9 and 10 would almost certainly require that the fabricating machine be readjusted.

Normally, the two photosensitive units 6 and 7 and the single difference amplifier 8 are sufficient to guide the fabricating machine in the reference plane. It is therefore suitable to position the photosensitive units 6 and 7 longitudinally, in vertical directions, so that they will respond even at greater deviations in height. The output lead 11 of the difference amplifier 8 delivers a control signal which, after appropriate reshaping, if such reshaping is necessary, may be utilized to control the height of the fabricating machine.

FIG. 2 shows all the components of FIG. 1, except for the photosensitive units 6, 7 and 10. The reference plane provided by the laser beam 5 may be adjusted by adjustment of the laser apparatus 3 with the assistance of the Nivellier device 2 (shown in FIG. 1, but not in FIG. 2).

FIG. 3 illustrates another embodiment of our invention in which the laser device provides controlled guidance of a fabricating machine in a straight reference line, rather than in a reference plane, as in the embodiment of FIGS. 1 and 2. Substantially the same components 1, 2, 3 and 4, as shown in FIGS. 1 and 2, are utilized to divide the laser beam produced by laser apparatus into two component bundles of rays with each of the two bundles of rays in a corresponding plane, with both planes intersecting each other at substantially 90°. The reference planes are thus in the form of a cross 15 of radiation. These components are not shown in FIG. 3, in order to maintain the clarity of illustration.

In the receiving apparatus of the embodiment of FIG. 3 of our invention, two sets or four photosensitive units, cells or elements 16, 17, 18 and 19 are utilized. The photosensitive units 16, 17, 18 and 19 are positioned in planes which intersect at right angles with each other. Thus, the photosensitive units 16 and 17 are coplanarly positioned in a vertical plane and the photosensitive units 18 and 19 are coplanarly positioned in a horizontal plane. The photosensitive units 16, 17, 18 and 19 are mounted on the fabricated machine. The reference line is that formed by the intersection of the reference planes formed by the laser beams 15.

A difference amplifier has its input connected to the outputs of the photosensitive units 16 and 17. Another difference amplifier has its inputs connected to the outputs of the photosensitive units 18 and 19. The difference amplifiers are not shown FIG. 3, in order to maintain the clarity of illustration. The difference amplifiers are indispensable in providing guidance in the fabricating machines along the straight reference lines formed by the intersection of the reference planes, since without said difference amplifiers, the photosensitive units 18 and 19, which provide lateral return guidance, cannot operate properly, because they are illuminated by the direct horizontally flared laser beam, as shown in FIG. 3. In the situation illustrated by FIG. 3, the fabricating machine is at the right height, but is laterally deviated to the right, relative to the reference line.

Overradiation of the photosensitive units, as aforedescribed, due to two flared laser beams positioned in perpendicularly intersecting relation, may be reduced by positioning the photosensitive units along the legs of a right triangle, rather than in intersecting planes. Quantitative elimination of overradiation may be provided by external radiation of the two component bundles of rays which provide the reference planes. The external modulation is at various frequencies, and the difference amplifier connected to the outputs of the photosensitive units 18 and 19 is tuned to one frequency, whereas the difference amplifier connected to the photosensitive units 16 and 17 is tuned to another frequency.

It is, of course, also possible to provide additional photosensitive units at greater distances from the photosensitive units already provided and positioned in the planes of the photosensitive units already provided. The photosensitive units positioned in a vertical plane are then all connected to one difference amplifier and the photosensitive units positioned in a horizontal plane are then all connected to another difference amplifier. The output signals produced by the difference amplifiers are utilized for the same control and/or alarm purposes as is the output signal of the difference amplifier 8 of the embodiment of FIGS. 1 and 2, upon a strong deviation of the fabricating machine from the reference line.

Interference filters for protecting the photosensitive units from external scattered radiation, as shown in FIG. 6, are known in the art. Thus, in an article entitled "Die Hauptanwendungsgebiete kohärenter Lichtquellen" by Von H. Bosc, appearing on pages 3 to 10 of Elektrisches Nachrichtenwesen, Band 37, Nummer 4, 1962, the use of interference filters in connection with laser beams is disclosed and in a flyer of Jena Glaswerk Schott & Gen., Mainz, No. 3701 d, Jan. 1965, entitled "Monochromatische Interferenzfilter." the availability of interference filters for almost any desired wavelength is disclosed.

While the invention has been described by means of specific examples and in specific embodiments, we do not wish to be limited thereto, for obvious modifications will occur to those skilled in the art without departing from the spirit and scope of the invention.

We claim:

1. A device for the controlled guidance of a fabricating machine in a reference plane, said device comprising
    securely mounted laser apparatus producing a modulated guide beam;
    means for modulating said guide beam;
    flaring means adjacent said laser apparatus for flaring sad guide beam in said reference plane; and
    receiving means stably affixed to a fabricating machine, said receiving means comprising at least two spaced photosensitive units positioned transversely to said reference plane, one on each side of said reference plane, and a difference amplifier connected to said photosensitive units in a manner whereby deviation of the fabricating machine from said reference plane produces an output control signal of said difference amplifier for guiding the fabricating machine back into said reference plane.

2. A device for the controlled guidance of a fabricating machine in a reference plane as claimed in claim 1, wherein said flaring means comprises a cylinder lens positioned in the path of said guide beam.

3. A device for the controlled guidance of a fabricating machine in a reference plane as claimed in claim 1, wherein said flaring means comprises a rotatably mounted mirror positioned in the path of said guide beam and rotated about an axis perpendicular to said reference plane.

4. A device for the controlled guidance of a fabricating machine in a reference plane as claimed in claim 1, further comprising scattered radiation shields adjacent said photosensitive units for protecting said photosensitive units from external scattered radiation, said shields comprising interference filters tuned to said guide beam.

5. A device for the controlled guidance of a fabricating machine in a straight reference line, said device comprising
    securely mounted laser apparatus producing a modulated guide beam;
    means for modulating said guide beam;
    beam-dividing means adjacent said laser apparatus positioned in the path of said guide beam for producing two component bundles of rays;
    flaring means adjacent said beam-dividing means for flaring each of said component bundles of rays in a manner whereby the flared bundles of rays form two reference planes crossing each other at substantially right angles; and
    receiving means affixed to a fabricating machine, said receiving means comprising two sets of at least two spaced photosensitive units, each set of photosensitive units being positioned transversely to a corresponding one of said reference planes with at least one of its photosensitive units on each side of said corresponding one of said reference planes and a pair of difference amplifiers each connected to a corresponding set of said photosensitive units in a manner whereby deviation of the fabricating machine from said reference line produces an output control signal of said difference amplifiers for guiding the fabricating machine back into said reference line.

6. A device for the controlled guidance of a fabricating machine in a reference line as claimed in claim 5, wherein said flaring means comprises two cylinder lenses each positioned in the path of a corresponding one of said bundles of rays.

7. A device for the controlled guidance of a fabricating machine in a reference line as claimed in claim 5, wherein said flaring means comprises two rotatably mounted mirrors each positioned in the path of a corresponding one of said bundles of rays and rotated about an axis perpendicular to a corresponding one of said reference planes.

8. A device for the controlled guidance of a fabricating machine in a reference line as claimed in claim 5, further comprising scattered radiation shields adjacent said photosensitive units for protecting said photosensitive units from external scattered radiation, said shields comprising interference filters tuned to said bundles of rays.

* * * * *